April 28, 1970     S. M. SALOMON     3,509,022
SENSING DEVICE FOR SLICE DELIVERY
Filed Dec. 11, 1967
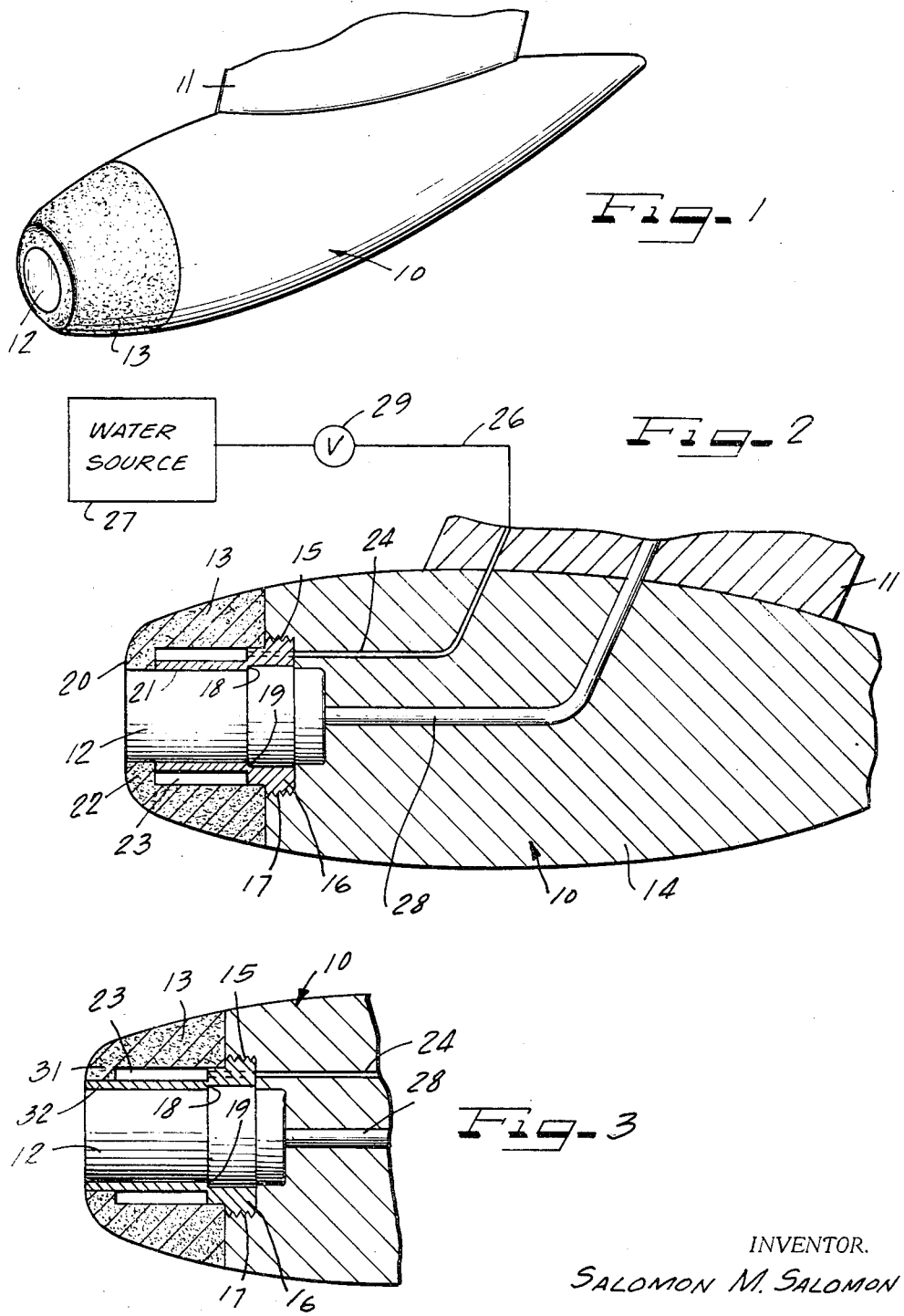
INVENTOR.
SALOMON M. SALOMON
BY Hill, Sherman, Meroni, Gross & Simpson
ATTORNEYS

United States Patent Office 3,509,022
Patented Apr. 28, 1970

3,509,022
SENSING DEVICE FOR SLICE DELIVERY
Salomon M. Salomon, Madison, Wis., assignor to Beloit Corporation, Beloit, Wis., a corporation of Wisconsin
Filed Dec. 11, 1967, Ser. No. 689,512
Int. Cl. D21 7/06
U.S. Cl. 162—263                                    19 Claims

ABSTRACT OF THE DISCLOSURE

A method and structure for continuously creating a lubricating boundary on the surface of a sensing device used in a slice delivery of a paper machine, for example, which prevents fibers from clinging to the sensing device and also reduces the drag caused by the boundary layer on the sensing device.

CROSS-REFERENCE TO RELATED APPLICATION

The copending application Ser. No. 490,389 entitled "Sensing Device for Slice Delivery" filed Sept. 27, 1965 now Patent No. 3,464,887, issued Sept. 2, 1969 discloses a sensing device for slice delivery for use, for example, in paper machines behind a headbox to sense and indicate various functions of the flow from the headbox such as velocity or flow pressure across the width of the slice delivery.

As pointed out in application Ser. No. 490,389, it is desired to accurately measure the velocity and other characteristics of a slice delivery from a headbox of a paper machine without disrupting the flow of the paper stock and with great accuracy. Paper stock contains fibers which can build up on a sensing probe to impair its accuracy. Also the flow of the moving paper stock is disrupted by the probe due to its drag.

The drag can be substantially reduced by streamlining the probe as shown in copending application Ser. No. 490,389. Further reduction of drag can be obtained by reducing the surface layer on the probe by supplying a source of lubricating liquid to the probe which flows about the probe but does not interfere with its detection capabilities.

The lubricating liquid also keeps the probe free of fibers and other materials in the paper stock so that it does not become clogged.

DESCRIPTION OF THE INVENTION

This invention relates generally to a sensing device for a slice delivery from a headbox and in particular to apparatus for decreasing the flow disturbance around the probe and to also lubricate the probe and reduce the drag caused by the boundary layer.

It is an object of the present invention, therefore, to provide an apparatus for continuously supplying a lubricating fluid to a sensing device so that fibers in paper stock passing the sensing device do not build up or clog the senser.

Another object of the invention is to provide lubrication for the surface of a probe in a stream of paper stock so that the flow pattern is smooth in the vicinity of the probe to substantially reduce the drag.

Another object of the invention is to provide a novel probe sensing device utilizing a liquid lubricant to obtain a smooth flow.

A feature of the invention is found in the provision for a sensing device for measuring the flow of paper stock from a headbox in which a supply of liquid is passed through minute pores of a porous metal cap forming a forward portion of the probe so that the surface of the probe is lubricated to smooth the flow about the probe and to prevent build-up of fibers in the vicinity of the probe.

Further objects, features and advantages of the invention will become apparent from the following description and claims when read in view of the drawings in which:

FIGURE 1 is a perspective view of the probe with the novel porous cap of this invention mounted thereon;

FIGURE 2 is a sectional view of the probe of FIGURE 1; and

FIGURE 3 is a sectional view of a modification of the invention.

FIGURE 1 illustrates a probe 10 of generally cylindrical shape mounted on a supporting arm 11 and adapted to be inserted into the flow from a sluice gate.

A forward portion of the probe 10 contains transducer 12 for measuring pressure.

The transducer 12 is mounted within a porous cover cap 13 which provides novel lubrication and flow smoothing characteristics in accordance with the invention.

As best shown in FIGURES 2 and 3, the probe 10 is formed with a main body portion 14 which is formed with an internally threaded opening 15. The cap 13 fits against the end of the main body portion 14. A liner 16 has a threaded portion 17 which mates with the threaded portion 15 and cap 13 is joined to it. The transducer 12 is received in the liner 16 and is formed with a shoulder 18 which mates with a shoulder 19 formed in the liner to lock the transducer in the liner.

A portion 21 of liner 16 fits about the transducer 12 and extends toward the nose 20 of the probe. The nose cone 13 fits over the liner 16 and is bonded to it adjacent portion 17. The outer surface of cone 13 streamlined to obtain smooth flow of the fluid in which the probe is to be immersed. The forward edge 22 of the cone 13 extends in to engage the transducer 12.

A cavity 23 is formed between the liner 16 and the cover cone 12. A liquid supply passage 24 is formed through the support 11 and the body portion 14 of the probe and the shoulder 17 of the liner 16 to communicate with cavity 23. A supply line 26 is connected to the support 11 so that it communicates with passage 24. A water supply 27 is connected to line 26. A valve 27 is mounted in line 26.

To cone 13 is made of porous material to allow fluid within the cavity 23 to pass from the cavity through the cone into the fluid stream to lubricate the surface of the cone. Cone 13 may be made of porous metal or ceramic and is formed with minute openings through which fluid from source 27 emerges. The liquid passes forward through portion 22 and outwardly through the cone.

An electrical cable 28 also passes through the main body portion 14 and support 11 to the transducer and make electrical connection with the transducer.

In operation, the valve 29 is opened and liquid passes from cavity 23 through the minute pores of the cap 13 to create a continuous lubricating boundary layer on the surface of the probe. This prevents fibers from sticking to the probe and reduces the drag of the probe. The liquid emerging from the cone reduces the interference to the flow pattern caused by the probe. Fibers which tend to build up on the probe are washed away by the flow of liquid from the cone 13.

FIGURE 3 illustrates a modification of the invention in which the forward portion of the liner 16 has been extended to the end of the transducer 12 and the cone 13 of porous material has been modified so that the forward edge 31 abuts against the liner portion 32. Liquid also emits from the end 31 of the probe and through the walls of cone 13. This structure operates substantially the same as that shown in FIGURE 2.

Although minor modifications might be suggested by those versed in the art, it should be understood that I wish to embody within the scope of the patent warranted hereon all such modifications as reasonably and properly come within the scope of my contribution to the art.

I claim as my invention:

1. A device for sensing characteristics of a slice delivery from a headbox comprising,
a transducer,
a housing with the transducer therein,
at least a portion of the housing formed of porous material,
means for supplying a lubricating fluid to said housing and passing said lubricating fluid through the porous material to lubricate the housing.

2. In apparatus according to claim 1 wherein said housing is of generally streamlined shape to obtain smooth flow in the slice delivery.

3. In apparatus according to claim 2 wherein the transducer is mounted in one end of the housing and the housing placed in the slice delivery such that it impinges on the transducer.

4. In apparatus according to claim 3 wherein the porous material of said housing substantially surrounds the one end of the housing.

5. In apparatus according to claim 4
a cavity formed in the housing, and
means for supplying a lubricating fluid connected to said cavity and the porous material forming at least one wall of said cavity such that lubricating fluid from the cavity may pass through the porous material to lubricate the housing.

6. In apparatus according to claim 5, a liner member mounted within the housing between the transducer and the housing and forming an inner wall of said cavity.

7. In apparatus according to claim 6 wherein the liner member encloses the transducer along its length and the porous material forms at least an end wall and an outer wall of said cavity.

8. In apparatus according to claim 7 wherein said end wall formed of said porous material is at the one end of the housing.

9. In apparatus according to claim 8 wherein the said one end wall of porous material extends inwardly to the transducer such that lubricating fluid may be furnished around the one end of the housing and toward the one end of the housing.

10. In apparatus according to claim 8 wherein said one end wall of porous material extends inwardly to the liner such that lubricating fluid may be furnished around the one end of the housing and toward the one end of the housing.

11. In apparatus according to claim 8 wherein the porous material is porous metal.

12. In apparatus according to claim 8 wherein the porous material is porous ceramic.

13. In apparatus according to claim 1 wherein said means for supplying a lubricating material to said housing comprises a fluid supply and a control valve.

14. In apparatus according to claim 1 wherein the lubricating fluid is water.

15. A device to sense velocity variations and other characteristics in fluid jets containing contaminates that will impinge on the device comprising,
a transducer,
a housing with the transducer therein, at least a portion of the housing formed of porous material, and
means for supplying a lubricating fluid to said housing and passing said lubricating fluid through the porous material to prevent the contaminates from clogging the housing.

16. Apparatus according to claim 15 wherein said housing is of generally streamlined shape and the transducer is mounted in the housing such that the fluid jet impinges on the transducer and the portion of porous material substantially surrounds the transducer.

17. Apparatus according to claim 16 wherein the porous material is porous ceramic.

18. Apparatus according to claim 16 wherein the porous material is porous metal.

19. The method of measuring flow in the slice delivery of a paper machine headbox comprising the steps of
positioning a flow sensing transducer in the slice stream, and
generating a flow of fluid over the transducer from a separate source providing a lubricating film over the transducer.

References Cited

UNITED STATES PATENTS 3,464,887   9/1969   Salomon _____ 162—263

REUBEN FRIEDMAN, Primary Examiner

T. A. GRANGER, Assistant Examiner

U.S. Cl. X.R.

73—205